United States Patent Office 3,632,828
Patented Jan. 4, 1972

3,632,828
POLYETHYLENE GLYCOL MONOMETHYL
ETHER CARBONATES
Ludo K. Frevel, Midland, and David F. Gransden, North
Bradley, Mich., assignors to The Dow Chemical Company, Midland, Mich.
No Drawing. Filed Dec. 16, 1968, Ser. No. 784,266
Int. Cl. C07c 69/00; C10m 3/20
U.S. Cl. 260—463                                4 Claims

ABSTRACT OF THE DISCLOSURE

Polyoxyethylene glycol monomethyl ether carbonates having the formula

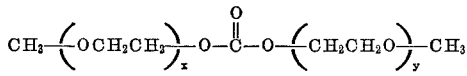

wherein $x$ and $y$ are independently 2 or 3 are new compounds that are useful in formulating brake fluids and as synthetic lubricants.

BACKGROUND OF THE INVENTION

Bis(2-methoxyethyl) carbonate and bis(2-(2-ethoxyethoxy)ethyl) carbonate are known and reported to be useful as plasticizers. See Drake et al., J. Am. Chem. Soc., 52, 3720 (1930).

Certain carbonic acid diesters of aliphatic alcohols and polyglycol monoethers are disclosed to be useful fuel and lubricant additives. See U.S. Pat. No. 2,821,538.

SUMMARY OF THE INVENTION

Polyoxyethylene glycol monomethyl ether carbonates having the formula

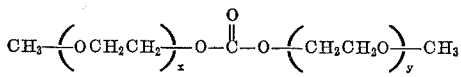

wherein $x$ and $y$ are independently 2 or 3 have now been discovered.

These new compounds, i.e. bis(2-(2-methoxyethoxy)ethyl) carbonate, bis(2-(2-(2-methoxyethoxy)ethoxy)ethyl) carbonate and 2-(2-methoxyethoxy)ethyl 2-(2-(2-methoxyethoxy)ethoxy)ethyl carbonate, are useful in formulating brake fluids and as synthetic lubricants.

The new compounds of this invention are made by a number of processes. For example, the appropriate polyethylene glycol monoether can be reacted with phosgene in any convenient manner, at a temperature between 0 and 100° C., to produce a reaction mixture which is then separated by conventional techniques, e.g. distillation, to yield the desired carbonate. Another convenient method of manufacture is the well-known transesterification process. For example, a dialkyl carbonate can be reacted with the appropriate polyethylene glycol monoether to yield the desired carbonate.

DESCRIPTION OF SPECIFIC EMBODIMENT

Preparation of bis(2-(2-methoxyethoxy)ethyl) carbonate

A 22-liter pot reactor equipped with a 1.5 i.d. x 30 inch column packed with 0.5 inch berl saddles was charged with 5,160 g. (43.7 m.) of diethyl carbonate, 11,550 g. (96.1 m.) of diethylene glycol monomethyl ether and 10 g. of sodium ethylate. This reaction mixture was heated to reflux and maintained there for 10.5 hours. During heating the formed ethanol was distilled from the reaction mixture. The unreacted diethylene glycol monomethyl ether was then stripped from the product mixture and the product mixture was then filtered to give 9,172 g. of impure product. 8,665 g. of this impure product was distilled under reduced pressure to give 7,984 g. of bis(2-(2 - methoxyethoxy)ethyl)carbonate of B.P. 137–166° C. at 1 mm. This product was 97% pure by gas chromatography. The major portion distilled at 150–153° C. at 1 mm.

Preparation of bis(2-(2-(2-methoxyethoxy)ethoxy)ethyl) carbonate

A 2-liter distillation flask equipped with a ⅞ i.d. x 18 inch column was charged with 167 g. (1.42 m.) of diethyl carbonate, 466 g. (2.84 m.) of triethylene glycol monomethyl ether and 0.2 g. of sodium ethoxide. Boiling stones were added and the reaction mixture was heated until the reaction temperature was about 170° C. before cooling. During the heating period, the formed ethanol was stripped from the product mixture at a head temperature of about 78° C. After cooling, the reaction mixture was filtered and distilled under reduced pressure to yield 302 g. of bis(2-(2-(2-methoxyethoxy)ethoxy)ethyl) carbonate boiling at 163–205° C. at 1 mm. The major portion of the product (268 g.) distilled at 203–205° C. at 1 mm.

Preparation of 2-(2-methoxyethoxy)ethyl 2-(2-(2-methoxyethoxy)ethoxy)ethyl carbonate A 2-liter flask equipped with a stirrer, thermometer, condenser and sparge tube was charged with 240 g. (2 m.) of diethylene glycol monomethyl ether and cooled to 0–55° C. before 199 g. (2 m.) of phosgene was added. with stirring, over a period of 3 hours. After phosgene addition, the mixture was stirred an additional 0.5 hour before 4 moles of pyridine dissolved in 250 ml. toluene was added over a period of one hour.

After this addition, the cooling bath was removed and 328 g. (2 m.) of triethylene glycol monomethyl ether was added over a period of 3 hours. The reaction temperature rose to 95–100° C. during addition and the reaction mixture was maintained at that temperature for an additional hour after addition. The mixture was then cooled, filtered, striped and distilled under reduced pressure to give 334 g. of 2-(2-methoxyethoxy)ethyl 2-(2-(2-methoxy)ethoxy)ethyl carbonate boiling at 162–196° C. at 1 mm. The center cut distilled at 172–186° C. at 1 mm.

Preparation of brake fluid

A base fluid that passed the SAE J1703 specifications for brake and clutch fluids was formulated using, by volume:

84 parts of bis(2-(2-methoxyethoxy)ethyl) carbonate, 16 parts of polypropylene glycol having an average molecular weight of about 1200 and 3 parts of a morpholine-ethylene oxide-propylene oxide reaction product made by condensing one mole of morpholine with 14 moles of propylene oxide added over a period of about 20 hours while in the presence of a catalytic amount of sodium hydroxide and thereafter reacting that product with about 3.5 moles of ethylene oxide added over a period of about ten hours where the reaction temperature for the entire period was about 108–115° C.

The formulated fluid had the following characteristics:

Boiling point _____ °F__  554
Viscosity, —40° F.: _____ cs__ 1645
   122 _____ cs__    6.5
   212 _____ cs__    2.7

This formulation passed the corrosion test with little or no loss on any of tinned iron, steel, aluminum, cast iron, brass and copper, while a formulation using 81 parts of the prior art bis(2-methoxyethyl) carbonate, 16 parts of the same polypropylene glycol and 3 parts of the same morpholine-ethylene oxide-propylene oxide inhibitor failed the corrosion test, especially affecting steel, cast iron, brass and copper.

In a similar manner, both bis(2-(2-(2-methoxyethoxy)ethoxy)ethyl) carbonate and 2-(2-methoxyethoxy)ethyl 2-(2-(2-methoxyethoxy)ethoxy)ethyl carbonate are useful in formulating brake fluids. For example, either of these compounds in mixture with bis(2-(2-methoxyethoxy)ethyl) carbonate are valuable as brake fluid ingredients.

We claim:
1. A compound having the formula

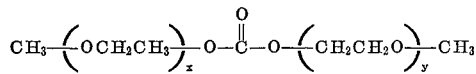

wherein $x$ and $y$ are independently 2 or 3.

2. A compound as defined in claim 1 wherein both $x$ and $y$ are 2.

3. A compound as defined in claim 1 wherein both $x$ and $y$ are 3.

4. A compound as defined in claim 1 wherein $x$ is 2 and $y$ is 3.

References Cited
UNITED STATES PATENTS

| 2,651,657 | 9/1953 | Mikeska et al. | 260—463 |
| 3,332,980 | 7/1967 | Leary et al. | 260—463 |

OTHER REFERENCES

Drake et al., J. Am. Chem. Soc. 52, 3720–3724 (1930).

LEWIS GOTTS, Primary Examiner

D. G. RIVERS, Assistant Examiner

U.S. Cl. X.R.

252—52A, 73

PO-1050
(5/69)

UNITED STATES PATENT OFFICE
CERTIFICATE OF CORRECTION

Patent No. 3,632,828        Dated January 8, 1972

Inventor(s) Ludo K. Frevel and David F. Gransden

It is certified that error appears in the above-identified patent and that said Letters Patent are hereby corrected as shown below:

Column 2, line 29, change "0-55°" to read -- 0-5° --.

Column 3, Claim 1, in the formula change the subscript "$_3$" to -- $_2$ -- to read

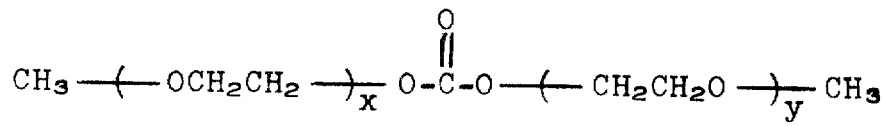

Signed and sealed this 27th day of June 1972.

(SEAL)
Attest:

EDWARD M. FLETCHER, JR.        ROBERT GOTTSCHALK
Attesting Officer                Commissioner of Patents